US006988093B2

(12) United States Patent
Pic et al.

(10) Patent No.: US 6,988,093 B2
(45) Date of Patent: Jan. 17, 2006

(54) PROCESS FOR INDEXING, STORAGE AND COMPARISON OF MULTIMEDIA DOCUMENTS

(75) Inventors: Marc Pic, Paris (FR); Hassane Essafi, Orsay (FR); Michel-Pierre Gayrard, Bois-Colombes (FR)

(73) Assignee: Commissariat a l'Energie Atomique, Paris (FR)

( * ) Notice: Subject to any disclaimer, the term of this patent is extended or adjusted under 35 U.S.C. 154(b) by 403 days.

(21) Appl. No.: 10/270,250

(22) Filed: Oct. 11, 2002

(65) Prior Publication Data

US 2003/0101164 A1 May 29, 2003

Related U.S. Application Data

(60) Provisional application No. 60/377,269, filed on May 2, 2002.

(30) Foreign Application Priority Data

Oct. 12, 2001 (FR) ................................. 01 13223

(51) Int. Cl.
*G06F 17/30* (2006.01)
(52) U.S. Cl. ...................................... 707/1; 707/104.1
(58) Field of Classification Search ................ 707/101, 707/103 R, 104.1, 1
See application file for complete search history.

(56) References Cited

U.S. PATENT DOCUMENTS 5,724,568 A * 3/1998 Bhargava et al. ............... 707/2
5,970,490 A * 10/1999 Morgenstern ................ 707/10
6,161,114 A * 12/2000 King et al. .................. 715/517
6,243,713 B1 6/2001 Nelson et al. .............. 707/104
6,584,480 B1 * 6/2003 Ferrel et al. ................ 715/513
6,615,211 B2 * 9/2003 Beygelzimer et al. ......... 707/6

OTHER PUBLICATIONS

P. Punpiti, et al., "In-picture search algorithm for content-based image retrieval", Image Processing, 1999, ICIP 99 Proceedings, 1999 International Conference on KOBE, Japan, Oct. 24-28, 1999, Piscataway, NJ, USA, IEEE, US, Oct. 24, 1999, pp. 129-133.
N. Hirzalla, et al., "Data model and a query language for multimedia documents databases", Multimedia Systems, Association for Computing Machinery, New York, US, vol. 7, No. 4, Jul. 1999, pp. 338-348.
J. Hunter, et al., "A comparison of schemas for video metadata representation", Computer Networks, Elsevier Science Publishers B.V., Amsterdam, NL, vol. 31, No. 11-16, May 17, 1999, pp. 1431-1451.

* cited by examiner

*Primary Examiner*—Frantz Coby
*Assistant Examiner*—Haythim Alaubaidi
(74) *Attorney, Agent, or Firm*—Weingarten, Schurgin, Gagnebin & Lebovici LLP

(57) ABSTRACT

A method of comparing two multimedia documents includes a three-step registration process. Each document is analyzed to extract concrete or abstract single medium or multimedia elements (meta-segments) from the document. The meta-segments are categorized to identify categories of information in the document. Then, a meta-identifier is produced for the document from the information that identifies the contents of the meta-segments. After registration, traces of the multimedia documents can be compared, without requiring the entire contents of the multimedia documents to be compared.

18 Claims, 8 Drawing Sheets

PROCESS FOR INDEXING, STORAGE AND COMPARISON OF MULTIMEDIA DOCUMENTS

The application claims the benefit of provisional application 60/377,269, filed May 2, 2002.

FIELD OF THE INVENTION

The present invention relates to a method of indexing, storing, and comparing multimedia documents, serving in particular for applications in searching for archived multimedia documents.

BACKGROUND OF THE INVENTION

With the digital revolution, there is an unprecedented explosion in the volume of data to be processed, and the documents in use are more and more often of the multimedia type, i.e. they make use simultaneously and interactively of a plurality of different modes of representing information: still or animated images, sounds, texts, photographs, video signals, animated vector graphics, . . . .

Various methods are already known for compressing data. Nevertheless, when all of the information contained in a multimedia document is compressed, the volume of data to be processed remains considerable, not only when the processing consists in archiving, but above all when it consists in comparing a plurality of multimedia documents in order to find particular information included in said multimedia documents.

BRIEF SUMMARY OF THE INVENTION

The invention seeks to solve the problem of managing large volumes of data within multimedia documents and of making it possible to compare multimedia documents without processing all of the data contained in the multimedia documents that are to be compared, even if the data is in compressed form.

According to the invention, these objects are achieved by a method of comparing first and second composite multimedia documents, each comprising at least two individual media selected from categories comprising images, sounds, video signals, animated vector graphics, and texts, the method being characterized in that it comprises the following steps:

a) allocating a meta-identifier to each of the first and second composite multimedia documents, which meta-identifier is in the form of a weighted hypergraph of nodes and relationships between said nodes and includes meta-segments unambiguously identifying individual media making up the multimedia document concerned;

b) performing recursion over secondary trees of intra-medium relationships of the individual media of each of the first and second composite multimedia documents;

c) for the hypergraph of each individual medium of the first multimedia document, performing an operation of maximizing matching with the hypergraph of an individual medium of the second multimedia document;

d) for the hypergraph of each individual medium of the first multimedia document, determining the costs of editing operations leading to maximum or quasi-maximum matching with a hypergraph of an individual medium of the second multimedia document, and expressing distances between the individual media as a function of said costs;

e) performing recursion over the main tree for producing inter-media relationships between the individual media of each of the first and second composite multimedia documents;

f) for the hypergraph of all of the individual media of the first multimedia document, performing an operation of maximizing matching with the hypergraph for all of the individual media of the second multimedia document; and g) for the hypergraph of all of the individual media of the first multimedia document, determining the costs of the edit operation that produces maximum or quasi-maximum matching with a hypergraph of all of the individual media of the second multimedia document, and expressing the distance between the first and second composite multimedia documents as a function of said cost.

Each individual medium may be a monomedium document belonging to a single category of media, or it may itself be a multimedia document comprising sub-elements belonging to different categories of media.

In a particular implementation of the method of the invention, steps c) and d) themselves comprise the following steps:

c1) for each individual medium of the first multimedia document to be compared with an individual medium of the second multimedia document, defining as a function of the looked-for similarities, an intra-medium cost function based on a principle of editing hypergraphs making reference to a similarity distance between hypergraphs;

c2) exploring all of the possible transformations enabling the hypergraph of each of the individual media of the first multimedia document to be transformed into a hypergraph that is as close as possible to the hypergraph of each of the individual media of the second multimedia document;

d1) determining the cost of each transformation in application of the rules defined in step c1); and d2) for each of the individual media of the first multimedia document, selecting the transformation of lowest cost.

Similarly, steps f) and g) may themselves comprise the following steps:

f1) for all of the individual media of the first multimedia document to be compared with the individual media of the second multimedia document, defining as a function of the looked-for similarities, an inter-media cost function based on a principle of editing hypergraphs with reference to a similarity distance between hypergraphs;

f2) exploring all of the possible transformations enabling the hypergraph of the first composite multimedia document to be transformed into a hypergraph that is as close as possible to the hypergraph of the second composite multimedia document;

g1) determining the cost of each transformation in application of the rules defined in step f1); and g2) selecting the transformation of lowest cost.

In another particular implementation of the method of the invention, steps c) and d) comprise implementing a sub-optimal optimization method such as a genetic algorithm, processing by a neural network or by simulated annealing, thereby producing a transformation whose cost is lowest in the context of the optimization method used.

Similarly, steps f) and g) may comprise implementing a sub-optimal optimization method such as a genetic algorithm, processing by a neural network or by simulated annealing, thereby producing a transformation whose cost is lowest in the context of the optimization method used.

In a particular aspect of the invention, when comparing a first composite multimedia document to which a meta-identifier is allocated and which is segmented into meta-segments, point-to-point comparison is performed of meta-segments of vector kind by means of a vector distance selected from distances of the Euclidean, Reimann with parameter L, and Mahalanobis types, so as to produce results constituting scores for pairing between meta-segments compared in pairs, and comparing meta-segments of the hypergraphs and producing a synthesized score for the distance between the documents by weighting the results of the point-to-point comparisons of the meta-segments by means of the probability of pairing between each corresponding branch of the trees of the two documents.

The method of the invention is advantageously applied to storing multimedia documents in a database, this storage operation comprising organizing hypergraphs representing the meta-identifiers of the multimedia documents to be archived by automatic hierarchical classification of branches that are common, identical, or quasi-identical.

More particularly, in the context of a method of storing multimedia documents in a database, the addition of a new meta-identifier corresponding to a multimedia document for archiving in a database already comprising a set of meta-identifiers and a set of intermediate objects representing portions of meta-identifiers designed to be easily recognized comprises the following steps:

i) breaking down the new meta-identifier into individual meta-identifiers encoding the various individual media contained in the multimedia document to be archived;

ii) constructing a tree for producing relationships between individual media; and iii) recursively applying steps i) and ii) to each individual meta-identifier to produce trees for producing relationships within each of the individual media, the trees being stored independently, but inclusion relationships being added to mark the links between an individual medium described in the tree for producing relationships between the individual media and the components of said individual medium in the tree for producing relationships within said individual medium under consideration.

More particularly, the step of breaking down a new meta-identifier is performed by scanning the entire hypergraph associated with the new meta-identifier and selecting groups of adjacent nodes having an identical medium.

Advantageously, the step of constructing a tree for producing relationships between individual media comprises, in particular, the following operations:

constructing a simplified hypergraph by associating a node with each individual meta-identifier and copying the relationships linking the nodes of the individual media to their respective meta-identifiers, while eliminating relationships of the same kind linking the same two nodes;

subdividing the hypergraph into connected sub-hypergraphs by increasing number of nodes;

organizing similar sub-hypergraphs having the same number of nodes into classes;

characterizing each class by a single representative holding average properties for the elements of the class; and organizing the previously defined classes in hierarchical manner by means of similarity relationships between portions of their representatives.

The invention also provides a method applied to searching for a multimedia document archived in a database, and characterized in that it comprises the following steps:

presenting a composite request itself comprising multimedia documents linked together by logical operators;

allocating a meta-identifier to each of the multimedia documents of the database, which meta-identifier is in the form of a weighted hypergraph of nodes and relationships between the nodes and includes meta-segments identifying in unambiguous manner the individual media making up the multimedia document concerned;

allocating a meta-identifier to the composite request, which meta-identifier is in the form of a weighted hypergraph of nodes and relationships between the nodes and includes meta-segments identifying unambiguously the individual media making up the composite request;

performing recursion over secondary trees of intra-medium relationships of the individual media of each of the multimedia documents of the database;

performing recursion over the secondary trees of the intra-medium relationships of the individual media of the composite request;

performing recursion over the main tree for producing inter-media relationships between the individual media of each of the multimedia documents of the database;

performing recursion over the main tree for producing inter-media relationships between the individual media of the composite request;

producing an overall hypergraph combining all of the hypergraphs of the composite request linked by said logic operators; and comparing said overall hypergraph with the hypergraphs of the multimedia documents of the database in application of the following steps:

for the hypergraph of each individual medium of the composite request, an operation of maximizing matching with the hypergraph of an individual medium of each of the multimedia documents of the database;

for the hypergraph of each individual medium of the composite request, determining the costs of edit operations that lead to maximum or almost maximum matching with a hypergraph of an individual medium of each of the multimedia documents of the database, and expressing distances between the individual media as a function of said costs;

for the hypergraph of all of the individual media of the composite request, an operation of maximizing matching with the hypergraph of all of the individual media of each of the multimedia documents of the database;

for the hypergraph of all of the individual media of the composite request, determining the costs of edit operations leading to maximum or almost maximum matching with a hypergraph of all of the individual media of each of the multimedia documents of the database, and expressing distances between the composite request and each of the multimedia documents of the database as a function of said costs; and organizing a list of multimedia documents of the database in decreasing order of previously calculated costs.

In a variant embodiment, the method applied to searching for a multimedia document archived in a database is characterized in that the steps of individually processing multimedia documents of the database are performed prior to presenting a composite request, and the results of said individual processing steps are stored for processing a set of different composite requests, in that the database is organized with storage comprising arranging hypergraphs representing the meta-identifiers of the multimedia documents to be archived by automatic hierarchical classification of identical or almost identical branches they have in common, and in that instead of comparing the full hypergraph of the composite request with the hypergraph of all of the multimedia documents in the database, a hierarchical search is performed in a tree structure of classes of hypergraphs of all of the multimedia documents of the database, and comparisons are performed between the overall hypergraphs of the composite request and the representatives of said classes.

The invention also provides a method of indexing a composite multimedia document comprising at least two individual media selected from categories comprising images, sounds, video signals, animated vector graphics, and texts, the method being characterized in that it comprises the following steps:

a) allocating a meta-identifier to composite multimedia document, which meta-identifier is in the form of a weighted hypergraph of nodes and relationships between said nodes and includes meta-segments unambiguously identifying the individual media making up the composite request multimedia document;

b) performing recursion over secondary tree structures of intra-medium relationships of the individual media of the composite multimedia document; and c) performing recursion over the main tree structure for producing inter-media relationships between the individual media of the composite multimedia document.

BRIEF DESCRIPTION OF THE DRAWINGS

Other characteristics and advantages of the invention appear from the following description of particular implementations given as examples, the description being made with reference to the accompanying drawings, in which.

DETAILED DESCRIPTION OF THE INVENTION

Figure 1:
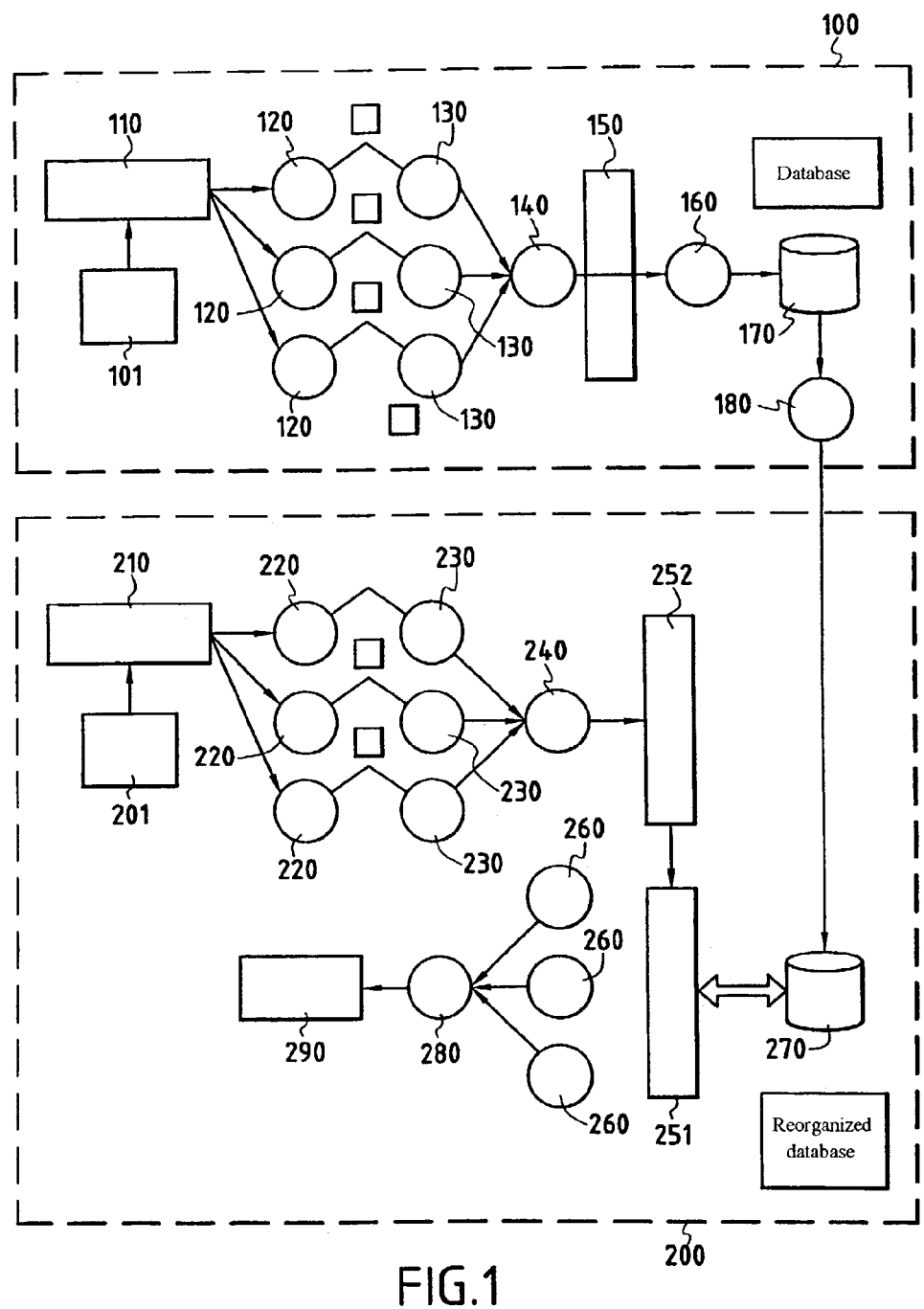
FIG. 1 is a diagram showing the various steps in an example of the method of the invention enabling a multimedia document to be indexed, the document to be stored in a database, and a request to be made interrogating the database relying on comparisons between multimedia documents.

Starting from a multimedia document of any kind whatsoever, the method of the invention makes it possible to obtain a recognizable trace which can then be used by comparison to recognize the use or reuse of all or part of the document or a variant of the document within some other multimedia document, without it being necessary to process the entire content of the multimedia documents being compared. Deriving and conserving the recognizable trace constitute an operation which is referred to by the term "registration" in the description below.

The document comparison method of the invention may be implemented equally well on storage media that are localized or on storage media that are distributed over a network, and in particular the method may be applied to tracking down documents.

The method of registering multimedia documents by content, which is a prerequisite for performing comparison operations between multimedia documents, essentially comprises three successive steps.

The first step is a meta-segmentation step which consists in analyzing the document in full so as to extract concrete or abstract monomedia or multimedia elements therefrom.

In a second step, the resulting meta-segments are characterized by specific digital processes that serve to identify categories of information which identify the content of the meta-segments unambiguously.

In a third step, a meta-identifier is produced made up of the information identifying the content of the meta-segments in unambiguous manner. The meta-identifier makes matching by content possible.

For example, a set of digital values may represent concrete items of information such as the histogram of the colors contained in an image of the document, or the Zernike moments of portions of the document. Abstract information may also be stored in the form of linked text fields specifying, for example, the relationship linking the image and the legend of a figure, or words covering a common semantic space in two documents, one a sound document and the other a text document, within multimedia documents.

The method of tracking down documents implements a particular structuring of the meta-identifiers that makes it possible to compare meta-identifiers effectively within a large number of multimedia documents. Comparisons may be performed by specific weighting (by means of multiplicative parameters adapted to each medium, coming from lists drawn up a priori) and by improvements made to these lists by each user (either by directly changing values or by causing them to be changed by a neural type training mechanism based on the profile of the user), the specific weighting being applied to algorithms for evaluating similarity between meta-segments.

The meta-segmentation process consists in implementing a plurality of digital processing algorithms on the digital data making up the multimedia document. The algorithms are used concurrently and they produce redundant information to which respective weightings are applied as a function of the success or failure rates of the various methods and as a function of the confidence levels given thereto.

Reference is given initially to FIG. 1 in which there can be seen the main steps of a method of indexing a multimedia document that is to be added to a database (module 100), and the main steps of a method of searching for a multimedia document in a database using a process of comparing a request with the traces of the multimedia documents stored in the database (module 200).

The method of indexing a multimedia document 101 to be indexed comprises an initial step 110 of adding the document in question to a database 170, where the step 110 consists in analyzing the document 101 to be indexed in such a manner as to extract the individual media therefrom, which media may be monomedia elements each belonging to a single category of media, or they may be multimedia elements themselves having sub-elements belonging to different categories of media.

The meta-segmentation process may be performed recursively, combining intra-medium analyses with inter-media analyses.

After the meta-segmentation step 110, the resulting meta-segments are characterized in steps 120 which may be processed in parallel, using digital processing means specific to identifying concrete and abstract categories of information which identify the content of the meta-segments in unambiguous manner.

During the following step 130, a meta-identifier is produced that is made up of the items of information characterizing the meta-segments. Steps 140 and 150 implement a process of structuring meta-identifiers and of defining the structure that is to be integrated in the database 170 by the process performed in step 160 of registering the document.

Step 180 represents a process of improving the internal representation of the database 170 after adding the structure S characterizing the document 101, this being done by making comparisons with the structures of previously registered multimedia documents.

The method of searching for a multimedia document shown in module 200 comprises presenting a search request 201 for a multimedia document that is to be found.

The request 201 is applied to an initial input step 210 which, like the step 100, consists in a step of analysis and of meta-segmentation to extract the individual media from the composite request 201. The meta-segments of the composite request 201 are characterized in a step 220 which is analogous to the step 120 of the indexing method, and which is in turn followed by a step 230 of producing meta-identifiers on the basis of the meta-segments, in a manner analogous to step 130. Like the steps 140 and 150, the following steps 240 and 252 implement a process of structuring the meta-identifiers and of defining the structure S for comparison with the structures S of the multimedia documents stored in the database 270 which is reorganized each time a new document is added thereto.

The step 260 consists in comparing the structure S from the composite request 201 with the structures S stored in the database 270 by evaluating the similarity of each meta-segment.

The step 280 consists in weighting the comparisons of the meta-identifiers, and the step 290 consists in presenting a list of pertinent multimedia documents together with their scores.

The meta-identifier mechanism which is implemented in the method of the invention serves to represent the characteristics of each medium contained within a multimedia document, and also the structure of the complex relationships that associate the various elements. This mechanism is hierarchical with a number of nesting levels that varies depending on the complexity of the multimedia document. Its encoding is in the form of a weighted hypergraph of nodes and of relationships between the nodes. The weightings of the nodes and of the arcs are in the form of number tensors encoded in floating-point or integer manner. Each node represents a characteristic which can be considered as being elementary at the corresponding level of breakdown in the hierarchy. At the lowest level, this might comprise, for example, a set of criteria for analyzing a document: for an image, these might be locally-calculated Zernike moments, color histograms, interactive function systems (IFSs), or any other local characteristic, examples of which are given below. At a higher level, this might be a hypergraph of characteristics of the portion of the analyzed medium that is symbolized by the node. The arcs between nodes represent structural relationships which link the characteristics. They can be of various kinds: logical (e.g. a node representing text is the legend of another node representing a figure), geometrical (e.g. a segmented object (node A) is 50 pixels to the right of another object (node B)), or abstract (e.g. a text-node contains vocabulary that is semantically close to another text-node).

Meta-identifiers include, in the form of a weighted hypergraph of nodes and of relationships between nodes, meta-segments that identify the individual media unambiguously, constituting compact items of information capable of describing the multimedia documents and suitable for enabling two documents to be distinguished between or to be matched by enabling the potential similarity between two multimedia documents to be measured without, nevertheless, constituting a compression of all of the information contained in the documents that they serve to identify. The meta-identifiers thus represent a volume of data that is much smaller than that of the documents from which they are produced.

The indexing and search method shown in FIG. 1 is described below in general terms with reference to a particular example shown in FIGS. 2 and 3.

Figure 2:
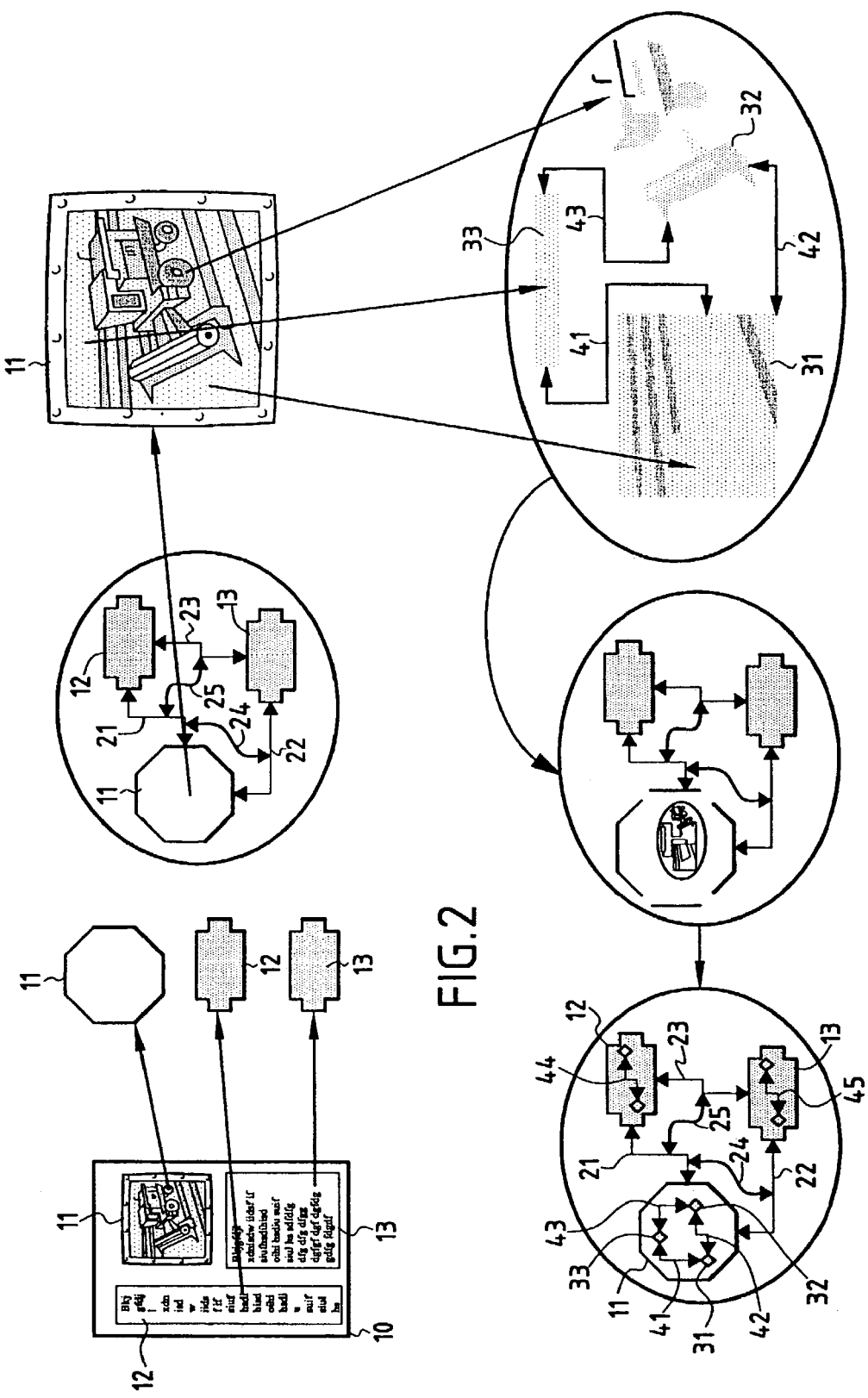
FIG. 2 is a set of diagrams explaining various steps in the indexing of a multimedia document for archiving in a database in accordance with the method of the invention.

FIG. 2 shows the process of indexing a multimedia document 10 which, on analysis, is found to comprise a first individual medium 11 constituted by an image, and two other individual media 12 and 13 each constituted by a respective portion of text. Following the meta-segmentation process, the individual media 11 to 13 are extracted from the multimedia document 10 and constitute meta-segments which are characterized by means of specific digital processes adapted to each type of medium concerned (text or image). Inter-media relationships 21 to 25 are discovered between the individual media 11 to 13, and within each individual medium, intra-medium relationships are identified. By way of example, three components 31, 32, and 33 are shown that result from segmenting the image 11, and that give rise to intra-medium relationships 41 to 43.

In the sequence shown in FIG. 2, there can be seen firstly hypergraphs of the inter-media relationships 21 to 25, and then the incorporation of the intra-medium relationships 41 to 43 within the image 11, and finally the incorporation of intra-medium relationships 4, 45 within the text blocks 12 and 13.

Figure 3:
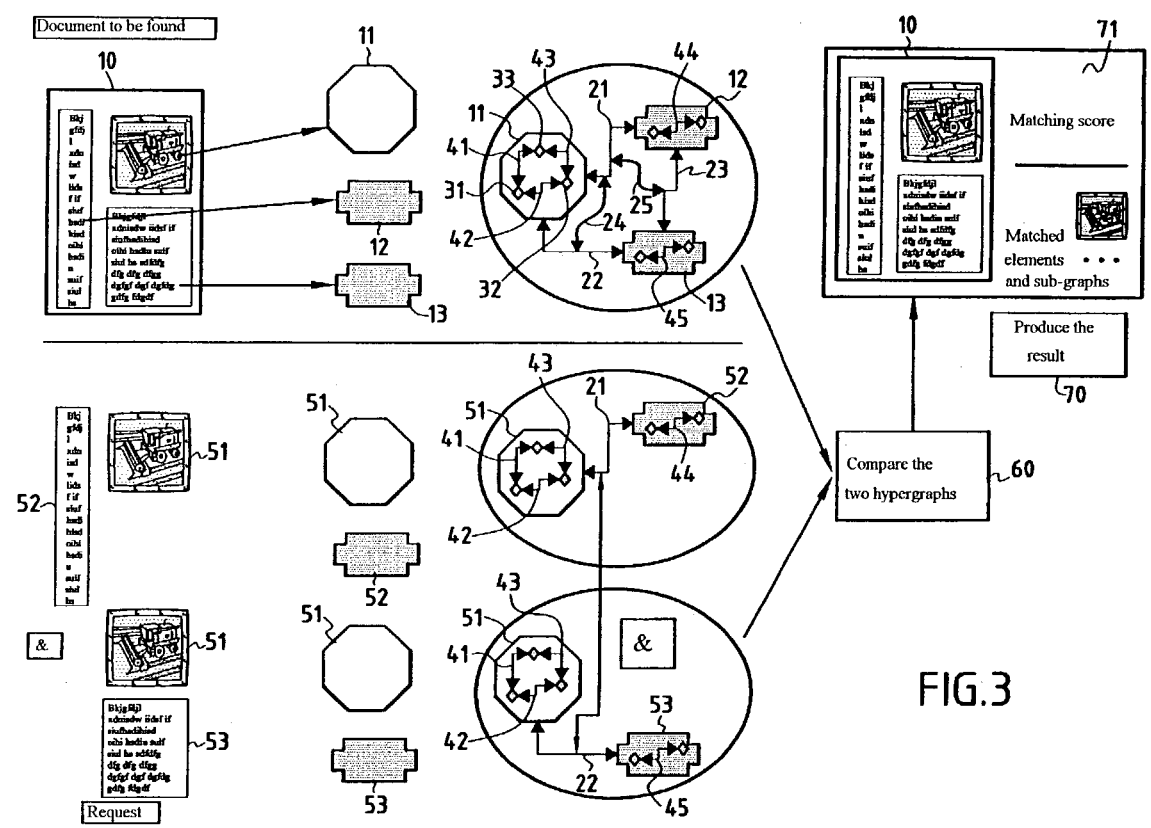
FIG. 3 is a set of diagrams explaining various steps in the process of searching for a multimedia document stored in a database, the search being based on a request and implementing a comparison method in accordance with the invention.

FIG. 3 shows a process of searching for a multimedia document from a composite request, applied to the same example as shown in FIG. 2.

The composite request comprises searching for a multimedia document in which there exists firstly an image 51 associated with a text block 52 and secondly the same image 51 associated with another text block 53. Each of the portions of the composite request linked by the AND operator is translated into a signature of meta-segments 51, 52 or 51, 53, respectively, and these meta-segments are organized in hypergraphs with intra-medium relationships 41 to 45 and inter-media relationships 21, 22. After the hypergraphs corresponding to each of the portions of the composite request have been united, a comparison is performed in step 60 between the hypergraph that results from the composite request and the hypergraphs of the multimedia documents stored in the database, with the best score being produced by the comparison with the hypergraph associated with document 10. The result produced in step 70 shows the document 10 and a pairing score 71.

The process of registering a multimedia document in a database and the process of improving the internal representation of a database after adding a new document by a method of comparison between documents is described below in greater detail with reference to FIGS. 4 to 6.

To provide rapid access to multimedia data contained in a database starting from meta-identifiers in accordance with the invention, it is necessary to begin by storing the meta-identifiers appropriately, a process referred to as "arrangement", and to construct intermediate objects capable of enabling comparisons to be formed rapidly between meta-identifiers.

The database is originally made up of a set of meta-identifiers and a set of intermediate objects that represent portions of meta-identifiers for ease of recognition. When a new meta-identifier is added to the database, the following insertion scheme is performed:

a) The meta-identifier is broken down into meta-identifiers encoding the various different media contained in the object (i.e. into monomedium identifiers). This breakdown is performed by traveling through the entire hypergraph and selecting groups of adjacent nodes that have identical media.

b) Building up a tree for producing relationships between media. This operation is performed by associating a node with each monomedium identifier and copying the relationships that link these monomedium nodes with their respective identifiers. Relationships of the same kind linking together two same nodes are eliminated (reducing redundancy). This produces a simplified hypergraph and an approximation to the relationship that exists in the complete multimedia document. The hypergraph is then split up into associated sub-hypergraphs by increasing number of nodes. This produces all of the two-node sub-hypergraphs included in the hypergraph. Thereafter, a search is made for similar sub-hypergraphs by performing point-to-point comparisons, a sub-hypergraph being compared with another sub-hypergraph for all combinations of sub-hypergraphs having the same number of elements. Similar sub-hypergraphs are classified by category and they are associated with entropy-type encoding: each class is associated with a representation of a length that is inversely proportional to the number of similar sub-hypergraphs within the class. Only those classes of sub-hypergraphs that have representations of lengths shorter than a value that is fixed in advance are retained. The process is repeated for all three-node sub-hypergraphs having a two-node sub-hypergraph belonging to a set that has been selected in this way, and so on for four nodes, etc. until a limit that is fixed in advance in order to avoid combinatory runaway or until there remains no more nodes in the hypergraph of the meta-identifier being analyzed. For each meta-identifier, the classes of sub-hypergraphs are then connected by weighted arcs which contain instantiation information of the meta-identifier. The set of arcs between all of the classes of the base constitutes a tree: this is the tree for producing relationships between media. If the analysis process is stopped before the fixed limit (i.e. if the process stops because there are no more nodes to be processed), then the following property is obtained: a path within the tree from its root to a leaf represents a meta-identifier. Otherwise, it is necessary to add a node for connecting together all of the terminal value sub-hypergraphs by means of an arc whose weighting contains information enabling the remainder of the tree to be reconstituted.

c) The same process is applied within each monomedium identifier to produce a tree for each medium: this is the tree for producing relationships within the medium. These various trees are stored independently, but inclusion relationships are added to show the link between a medium described in the tree for producing relationships between media, and the components of the medium in the corresponding tree for producing relationships within the medium. This relationship is obtained by copying the original arc of the meta-identifier which represents this relationship.

It should be observed that each of the trees considered in this way possesses as its nodes hypergraphs of relationships.

The database is then constituted by a main tree encoding the relationship between media within documents, and secondary trees encoding for each of the media. Each meta-identifier (and thus its document) is represented uniquely by means of one path through the main tree and one or more paths in the secondary trees that are needed as a function of the media used.

This structure is also used when estimating similarity between meta-identifiers (i.e. between documents).

Figure 4:
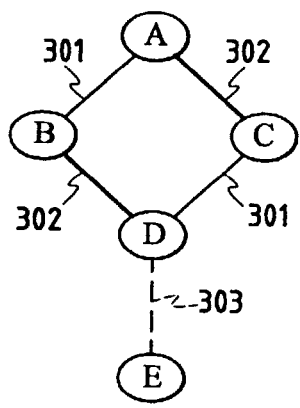
FIG. 4 is an example of a graph representing a multimedia document.

FIG. 4 shows the graph representing a multimedia document and, by way of example it has elements A and B linked by a first relationship 301, elements C and D linked by the same relationship 301, while the elements A & C and B & D are linked in respective pairs by a common relationship 302 that is different from the relationship 301. The element D is itself also linked to another element E by a third relationship 303.

Figure 5:
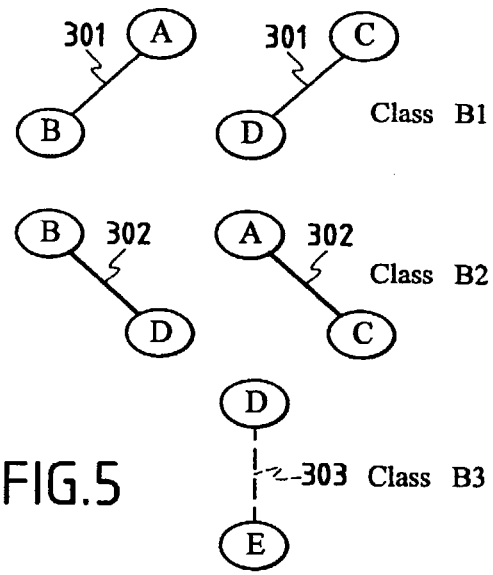
FIG. 5 shows how the FIG. 4 graph can be broken down into binary elements.

FIG. 5 shows how the graph of FIG. 4 can be broken down into binary elements. The elements linked by the relationship 301 belong to a class B1. The elements linked by the relationship 302 belong to a class B2. The elements linked by the relationship 303 belong to a class B3.

Figure 6:
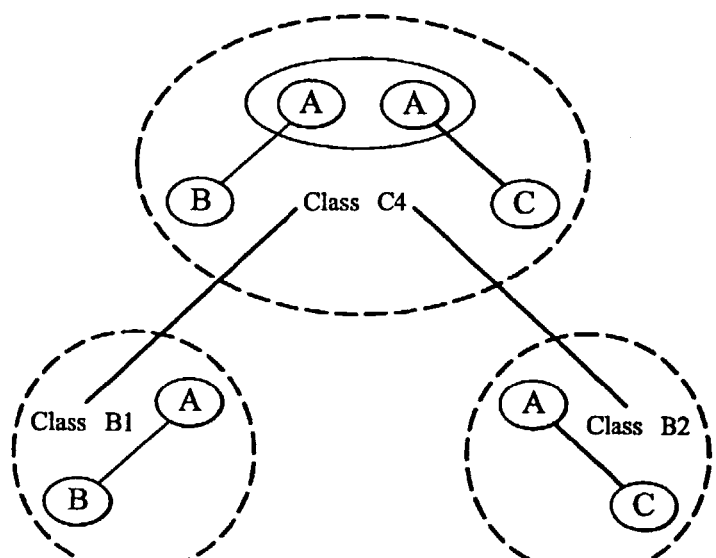
FIG. 6 is an example of a relation-producing graph.

FIG. 6 shows the relationship production graph with links between a class C4 of elements that are linked both by relationship 301 and by relationship 302, and a class B1 of elements that are linked by the relationship 301 only, and a class B2 of elements that are linked by the relationship 302, only.

The process of comparing meta-identifiers is described below in general terms.

The similarity between two meta-identifiers is obtained by comparing each of its components (nodes and arcs together with their weightings), the relationships linking them, and finally associating a synthesized distance to all of them.

Similarity calculation is performed by means of recursive methods on the elements of the hypergraph of the meta-identifier. A cost function based on a hypergraph editing principle (cf. string-edit or graph-edit) is applied to determine the distance between the weighted hypergraphs of the two meta-identifiers. The editing operation is calculated to procure the maximum degree of matching between the two hypergraphs. The cost of this operation constitutes the similarity distance between the two meta-identifiers.

In more detailed manner, multimedia documents are compared by means of their meta-identifiers as follows:

The process comprises two nested operating loops: the first is recursion within each individual medium within the composite documents, and the second is recursion over all of the individual media in the composite documents.

To determine the distance between two composite documents A and B: a search is made to find the strongest possible matching between the portions of the composite documents and the transformations of lowest possible cost for transforming a composite document A into a composite document B.

The transformations that are authorized for going from a document A to a document B are the following edit operations:

adding a link, a branch, or a terminal leaf;

deleting a link, a branch, or a terminal leaf;

changing the content of a branch or a terminal leaf.

The notion of cost associated with these edit operations depends on rules that are fixed in advance (steps b) and l) defined below), for example changing the content of a terminal leaf can be measured as the distance between the original content and the final content weighted by a coefficient (e.g. 1). The distance between the contents is the distance that applies to characterizing the medium, for example the visual similarity distance (Zernike+Mahalanobis) for images.

Finally, a plurality of transformation operations may make it possible to go from a document A to a document B, for example if A and B differ by a branch containing a medium $u$ in A and a medium $v$ in B, it is possible to apply:

i) either the transformation: "change u into v";

ii) or else the transformation: "delete u" followed by the transformation "add v".

A priori, the cost of those two operations is not necessarily identical. The transformation having the lower cost is retained. To do this, it is possible to explore all non-degenerative options in full (lengthy but precise), or on the contrary it is possible to make use of a conventional sub-optimal optimization method which provides an approximate solution, and thus an approximate transformation cost, i.e. a value for the distance that is approximate, but sufficient (fast but less precise).

The detailed comparison process is as follows:

a) recursion over the individual media (secondary trees);

b) defining the intra-medium cost function as a function of the looked-for similarity;

c) a mechanism for maximizing matching for each individual medium: two options:

d) first option: optimum method e) scanning all possible transformations which enable the hypergraph of medium M to be transformed into the hypergraph of medium L;

f) determining the cost of each transformation in application of the rules defined in b);

g) selecting the lowest-cost transformation;

h) second option: sub-optimal method i) using a sub-optimal optimization algorithm (generic algorithm, neural network, simulated annealing, etc.) to produce a transformation having the lowest cost possible when applying the particular method;

j) the distance between individual media is the cost of the optimal or sub-optimal edit operation that is discovered, the transformation operations that are retained being those which correspond to this edit operation;

k) performing recursion over the tree for producing relationships between media (main tree);

l) defining the inter-media cost function as a function of the looked-for similarities;

m) a mechanism for maximizing matching between two individual media: two options:

n) first option: optimal method o) scanning all possible transformations which enable the hypergraph of composite document A to be transformed into the hypergraph of composite document B;

p) determining the cost of each transformation in application of the rules defined in l);

q) selecting the lowest-cost transformation;

r) second option: sub-optimal method s) using a sub-optimal optimization algorithm (generic algorithm, neural network, simulated annealing, etc.) to produce a transformation whose cost is the lowest possible given the method used;

t) the distance between the composite documents is the cost of the optimal or sub-optimal edit operation found.

Figure 7:
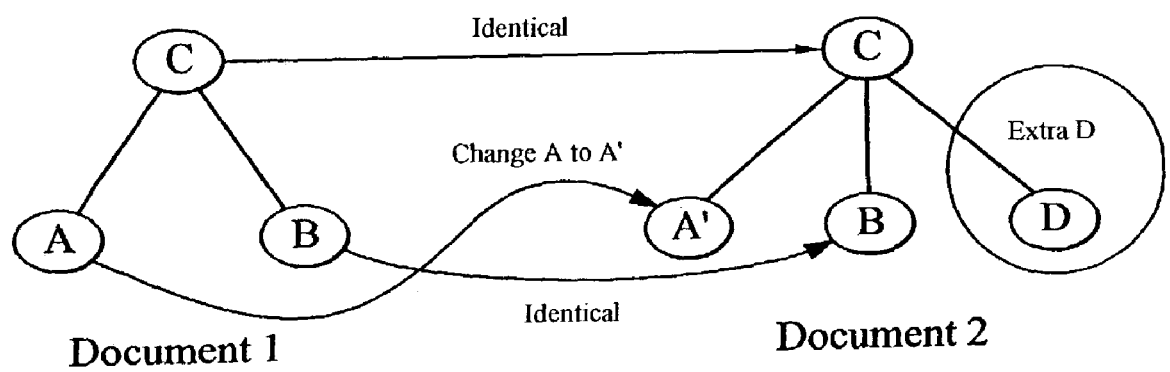
FIG. 7 is a diagram showing comparison between two examples of representation graphs for two multimedia documents.

FIG. 7 shows one possible example of determining the distance between two composite documents.

The graph of document 1 comprises elements A and B linked to an element C.

The graph of document 2 comprises elements A', B and D linked to an element C.

To transform document 1 into document 2, it can be seen that the elements C and B are identical in both documents 1 and 2 but that element A is changed into element A' on going from document 1 to document 2. In addition, document 2 has an extra element D connected to element C.

The cost of these transformations, i.e. the distance between the two composites documents 1 and 2 can be expressed as follows:

cost of changing A into A': $|A-A'|*2.0$ cost of adding D: $val(D)*5.0$ cost of going from B to B: 0 cost of going from C to C: 0 total cost of transformation=$2.0*|A-A'|+val(D)*5.0$

The comparison of multimedia documents by comparing the meta-segments or meta-identifiers which identify them essentially comprises the following three stages:

a) producing the segmentation into meta-segments (signature) of each of the documents to be compared in application of the above-described method;

b) point-by-point comparison of the meta-segments of vector kind using a vector distance:

i) vector distance: a distance of one of the following types is used:

a) Euclidean $\sqrt{(\Sigma x_i^2)}$ b) Riemann with parameter L: $\sqrt{(\Sigma x_i^L)}$ c) Mahalanobis j) normalizing this distance relative to a mean distribution estimated relative to a reference multimedia document base, where several options are possible:

a) no normalization;

b) mean value normalization: each distance value calculated in the preceding step is divided by the mean of the vector distances calculated between all of the images of the reference base taken image pair by image pair:

k) the resultant is referred to as the "pairing score" between the two compared meta-segments;

c) comparing the meta-segments of the hypergraphs and producing a synthesized score for the distance between the documents by weighting the results of the point-to-point comparisons of the meta-segments by the probability of pairing between each of the corresponding branches of the trees for the two documents. This is done as follows:

i) selecting the hypergraph distance parameters that are to be applied:
1) characterizing the hypergraph distance by defining cost rules for the graph edit operations: adding a node, deleting a node, adding a link, deleting a link;
2) allocating a cost for each of these operations, several variants are possible:
   a) uniform: equal cost for all edit operations;
   b) hyper-uniform: equal cost for all edit operations at the same hypergraph level as this hypergraph level;
   b) variable: costs parameterized manually as a function of experiments concerning the nature of the documents being modelled;
ii) calculating the sum of the costs that apply for transforming the tree of the first document into the tree of the second document. If a plurality of transformations can be applied, than the lowest value sum is selected. To simplify this calculation, it is possible to choose to apply a cost-calculation rule based on a sub-optimal process and to be satisfied with the result thereof;
iii) the minimum or sub-minimal sum of the costs constitutes the pairing score of the two documents.

With reference to FIGS. 11 to 14, there follows a description of comparing meta-segments or meta-identifiers with a request in a process of searching for a document in a database.

A request expressed in the request language referenced ( ) is converted into a vector meta-segment signature of value corresponding to the index of the individual request. These meta-segments are organized into hypergraphs by describing the request in the form of hypergraphs of relationships between individual requests and translating the operators of the relationships in the requests as follows:

Operator $a$ AND $b$: produce a parent hypergraph node having vector meta-segment nodes $a$ and $b$ attached thereto.

Operator $a$ OR $b$: produce two distinct hypergraphs with $a$ in one and $b$ in the other taking the place of the node (a OR b).

Operator NOT $a$: replace node $a$ with the addition of a flag representing the sign of the presence of $a$ (locally).

The signature is compared in the same manner as in the preceding step except for comparing the flag encoding the sign: the score produced by comparing each branch is weighted by the sign of the node using the following relationship: (1−score/norm(score)). Other formulae could nevertheless be used (such as a binarizing formula of the form (score/norm(score)>threshold)?(−1);(0)), etc.).

This process is shown in FIGS. 11 to 14 by a typical case: there are three individual media $a$, $b$, and $c$. $a$ and $b$ are both text, $c$ is an image. A search is being made for all documents presenting images resembling $c$ having a legend containing text $a$ or text $b$. A search is thus being made that is formulated as follows "(a or b) and c", but with the further condition that the nature of the link that is to connect $a$ or $b$ with $c$ is a link of the type "is legend of". This is described in hypergraph terms in FIG. 11 by way of example.

Figure 12:
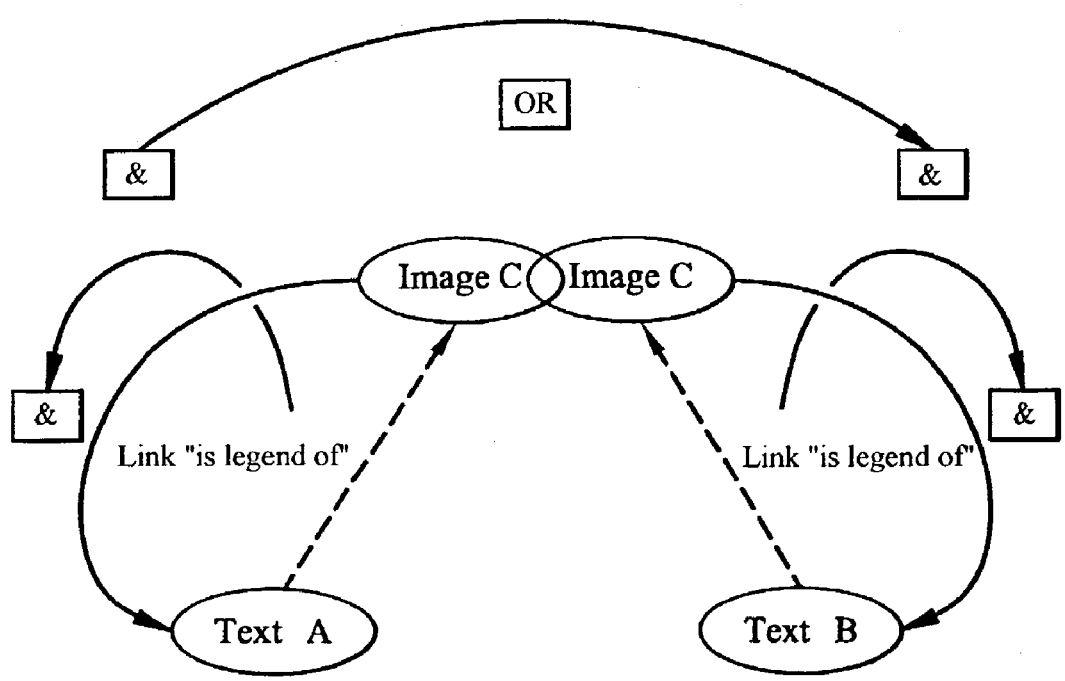
FIG. 12 is analogous to FIG. 11, but is a diagram in the form of a request hypergraph.

FIG. 12 shows a translation into the form of a request hypergraph.

Figure 13:
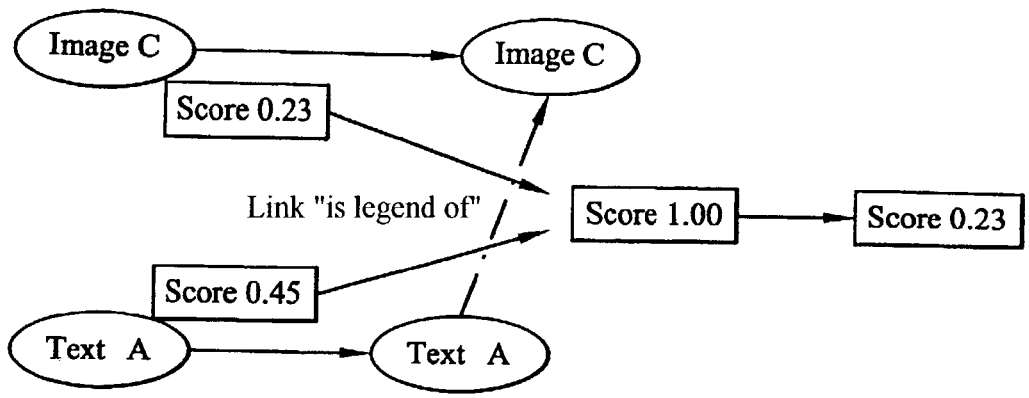
FIGS. 13 and 14 show two examples of comparison between individual sub-hypergraphs in a search graph with individual sub-hypergraphs classified in the database.
Figure 14:
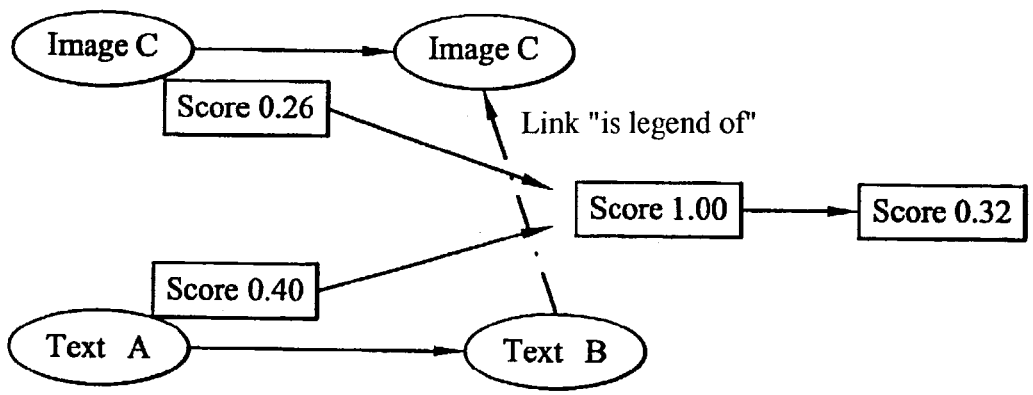

These hypergraphs are then compared with the hypergraphs present in the document database, an example being shown in FIGS. 13 and 14. The individual sub-hypergraphs of the search graph are compared recursively with the classified individual sub-hypergraphs of the database, beginning with the individual elements: images and texts. By way of example, the calculation for two documents each containing only one of the two options is as follows: A and C for the first C and B for the second. Comparison produces a link having a score of 1.00 since it is exactly what is requested.

There follows a description of an example of intra-medium analysis applied to image media in the context of producing a local meta-identifier of the image medium.

An image medium presents several categories of element enabling it to be characterized. It is useful when identifying such a document to be able to establish connections between the elements extracted from these various categories.

Within image media (photographs, diagrams, plans, drawings, . . . ), various characteristics are used in hierarchical manner to constitute the local meta-identifier of the image medium. The meta-identifier can itself be included in the meta-identifier of the multimedia document in which the image medium is contained. The term "image" is used below to designate an image medium in generic manner.

The process of constructing a meta-identifier of an image comprises four parts. It is applied recursively to each part of the image in question.

1. The first level of analysis consists in segmenting the medium into components that can be analyzed independently. A plurality of segmentations are used simultaneously:
   segmentation by texture (conventional methods);
   segmentation by object; and
   segmentation by scale (wavelet method).

2. The second part consists in creating a local identifier capable of characterizing each of the parts separately.

3. The third part consists in extracting structural relationships linking the parts.

4. Finally, the fourth part consists in reapplying the analysis process as defined in this way recursively on each of the parts. The meta-identifier constructed for each part is included by adding arcs that encode "object inclusion" relationships between nodes of the meta-identifier for the part to be included and the node or nodes of the hypergraph of the preceding level corresponding thereto. The process stops either on reaching a maximum level that is fixed in advance, or else when the segmentation methods produce no new parts.

The parts of the images can be characterized by means of salient points.

The purpose of this technique is to provide a tool enabling effective archiving of media for which conventional database management techniques are inapplicable. For example, the indexing of images in present databases requires each image to be described in natural language, using a textual corpus of defined expressions. The photograph of a painting can be indexed using key words such as "the painting contains: a skull, two figures in Renaissance costume, with a background made up of a table, a compass, and charts, together with tapestries". As a general rule, in order to continue with the same example, a painting is described using its physical characteristics, such as the size of the canvas, the type of the medium (canvas, wood, . . . ), and the kind of paint (oil, . . . ). It is very useful to have such information in the database, but it does not suffice, for example, when attempting to quickly identify a stolen painting. In contrast, it is more advantageous to be able to identify an image starting from another image using local and overall characteristics concerning textures and outlines. The images can be compared by using local characteristics (Zernike moments or IFS) in order to make accurate use of the content of an image. It is possible to use an adaptive grid based on points of interest and on salient points (extracted from a Stephen-Harris detector) in order to produce local characteristics which are stored in the database as keys for finding the image.

Figure 9:
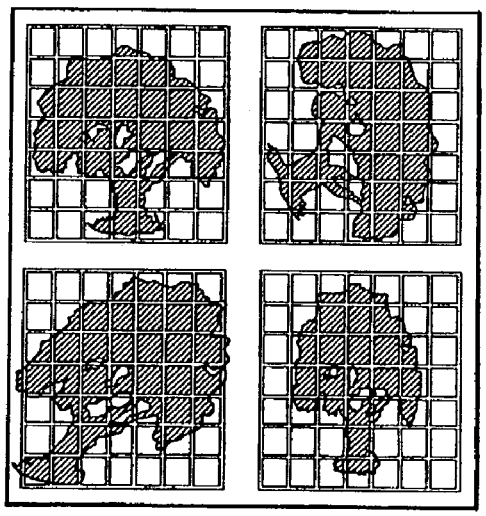
FIGS. 9 and 10 show the application of two different methods for extracting local information on two series of four images.
Figure 10:
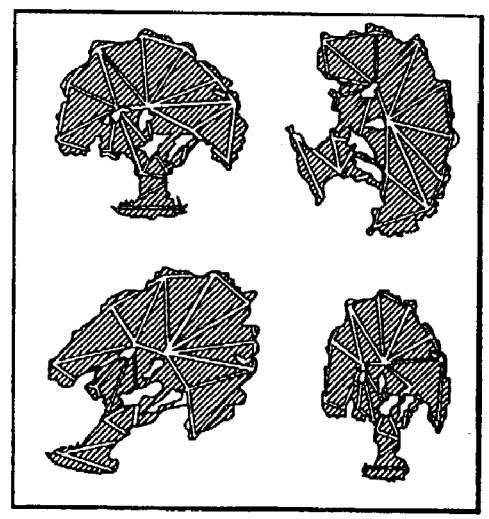
Figure 11:
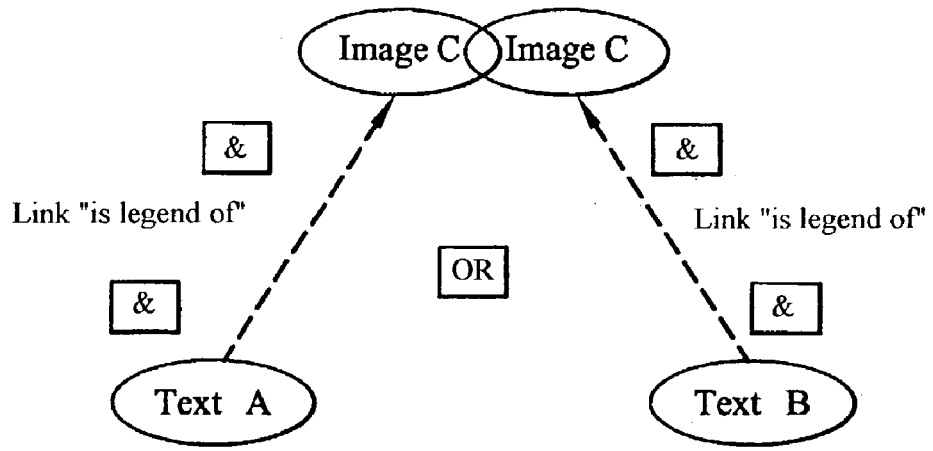
FIG. 11 is a diagram showing a process of searching for a multimedia document by relying on a method of comparison in accordance with the invention.

FIGS. 9 and 10 show the concept and the advantages of adaptive grids enabling local information to be extracted. FIG. 9 shows that the content of each part of the partition is different in four different drawings such that their signatures are different. In contrast, in FIG. 10, for the same four different drawings, the partitioning and the content of each partition remain the same, such that the signatures will all be very similar.

Such a technique can be used for documents comprising both images and texts, providing the structural organization of composite documents is preserved. Sound can also be analyzed and indexed on the same principles. Video signals or other multimedia objects can also be processed in the same manner (due to mosaic technologies and representations), providing they present a composite structure made up of basic media.

The method of constructing a meta-identifier for an image, which comprises four parts, is set out below in greater detail.

1. The first level of analysis consists in segmenting the medium into components that can be analyzed independently, which can be referred to as "characteristic components". Several types of segmentation are used: in this case also, the principle of an ordered list is applied. These methods should be used as follows within the process: as a function of the nature of the multimedia documents being analyzed and of the external characteristics of the processing, such as constraints concerning speed, available memory, etc., and ordered list of methods to be used on a priority basis is drawn up on the basis of a list of methods such as the methods described below. The methods with the best classification in the list are applied until a threshold depending on previously indicated constraints is reached.

Segmentation by texture: using filters, gradients, and thresholds, segmentation is performed into regions:
matrices of co-occurrences and texture indices;
multiple-order moments;
correlation methods using local histograms;
etc.

Segmentation in terms of objects:
segmentation by blocks;
non-supervised Markovian method, forming germs or growing low level regions or growing high level regions;
the semi-supervised Markovian method;
etc.

Segmentation by scale:
the wavelet transform method;
the wavelet packet method;
the method of geometric pyramids based on neighborhood.

Segmentation by contours:
Sobel filtering;
Prewitt filtering;
Kirch directional filtering;
Hueartas-Medioni operator;
Marr operator;
Canny optimal filtering;
Deriche filtering;
Shen filtering;
morphological gradient;
"watershed" method;
Haralick operator;
Hueckel operator.

Other strategies: once the characteristics which locally characterize the signal presented to the following stage of this process have been determined, a statistical method for grouping data can be applied (k-mean grouping, reduction to principal components, singular value analysis, N-sigma analysis) in order to perform or correct the segmentation.

2. The second part consists in creating a local identifier capable of characterizing each of the parts separately. To do this, one or more methods are used from a pre-established list, still making use of the principle of an ordered list. These methods must be used in the following manner within the process: as a function of the nature of the multimedia documents analyzed and of the external characteristics of the processing, such as constraints concerning speed, available memory, etc., an ordered list of methods to be used on a priority basis is drawn up on the basis of a list of methods such as the methods mentioned below. The methods best placed in the list are applied up to a threshold depending on the previously mentioned constraints:

An overall n-point histogram: a vector representing sampling on $\bar{n}$ values (optionally equidistant values) of the histogram of the image.
A local n-point histogram: the same applied to the neighborhood of a point (of arbitrary shape: disk, polygon, bezier curves, etc., optionally depending on the content or on other characteristic components).
Local statistical functions descriptive of the content or its orientation: Zernike coefficients, Hough coefficients, moments, etc., calculated in neighborhoods (cf. above).
Multi-scale functions: wavelets, Haar functions calculated over the entire image or over a neighborhood.
Functions characterizing the characteristic shape or shape invariants extracted from the image: for example extraction by skeletonizing and binarizing curves whose invariants are measured by Fourrier-Meulin.

The parts produced during the preceding stage can equally well be:
points;
lines or outlines;
regions.

The characteristics are thus associated with these three categories:

Characterization of points:
by their coordinates;
by the local properties of the neighborhoods of these points (neighborhoods of various kinds: triangulation, squares, rectangles; also of various sizes: depending on the resolution of the image, on the complexity of the calculations, on the scope of the filters or of the polynomials)
moments of polynomials (Zernike, Tchebichev, etc.)
histograms based on a color model (HSV model, RGB model, etc.).

Characterization of lines or outlines:
by their points and their coordinates;
by their shape: interpolation calculations using a common analytic curve (e.g. b-spline, polynomials, . . . ) and the factors specific to the curve are represented;
by local properties calculated in the neighborhood of these points: the methods are the same as in the above list; in contrast, the neighborhoods is more complex: it appears as a composition of the above neighborhoods.

Characterization of regions:
by their points and the coordinates thereof;
by their shape: interpolation calculation using a common analytic surface (e.g. 2D-b-spline, 2D polynomials, . . . ) and the specific factors of the surface are represented;
by local properties calculated in the neighborhood of these points: the methods are the same as in the above list; in contrast, the neighborhood is more complex, it appears as a composite of the above neighborhoods or more simply as the surface covered by the region of the medium image.

3. The third part consists in extracting the structural relationships that link its parts using a process analogous to that described below with respect to extra-media analysis.

4. The fourth part consists in reapplying the analysis process as defined above recursively on each of the parts. The meta-identifier constructed for each of the parts is included by adding parts encoding "object inclusion" relationships between the nodes of the meta-identifier of the part to be included and the node(s) of the graph of the preceding level correspond to said part. The process stops either on reaching a maximum level fixed in advance, or else when the segmentation methods no longer produce any new parts.

There follows an example of characterizing parts of a media image by means of salient points used in the preceding system.

Various methods of local or overall characterization can be employed to produce the weightings of the meta-identifiers. The characteristics extracted in the context of media image indexing can be separated into global characteristics and local characteristics. The global characteristics correspond to the overall appearance of the organization of the media image. For example, in a calorimetric description of a photograph database, sunsets can be represented by the distribution in the media image of a red color in an upper portion of the media image in which there can be seen a more or less orange circular arc. Naturally, such a description is approximate, and does not enable all media images of sunsets to be found (error by omission) and will select media images which are not sunsets (noise type error). Local methods require invariant properties to be extracted from each media image so as to be able to compare them. In the example of FIGS. 9 and 10, two methods are shown. One of them is not robust in the face of changes of viewpoint, and is based on using an absolute grid (FIG. 9), while the other method shown in FIG. 10 operates by detecting points of interest, followed by triangulation to extract the meshes of a grid in which local characteristics are to be calculated, and these characteristics are robust in the face of ordinary transformations due to changing points of view (Zernike moments or iterated function system, color histograms).

The description below relates to the process of inter-media analysis (or extra-media analysis) within a multimedia document.

The description of a multimedia document needs all of its components to be characterized.

A multimedia object is made up of monomedium elements that can be analyzed independently and in parallel. The process of producing a meta-identifier consists in breaking down the multimedia document in this way into media that are more elementary, while keeping a trace of the structural relationships that link these various media, and then in reapplying the same strategy on each of the media independently, conserving the trace of the structural relationships linking them.

The first stage of the process consists in segmenting the original multimedia document into components that are more elementary. To do this, three tools are applied in succession:

1. Tool for segmentation by medium: the information contained in the format of the document is separated into a plurality of media: audio, video, behavior (programs, HTML or XML descriptions, etc.).

2. Tool for segmentation by time: if the medium presents a time extension, it is subdivided into sections that are uniform with respect to time. To do this, one or more spatial uniformity functions are calculated for the medium. The following can be calculated:
the histogram of signal values (e.g. luminance for an image signal);
the averaged projection of luminance along the X axis for an image signal;
the averaged projection of luminance along the Y axis for an image signal;
various approximations to said signal at different scales by applying a median filter or a mean filter;
various approximations to said signal by means of wavelet filters;
etc.

Thereafter, the correlations between these uniformity functions over time are determined. One or more of these correlations exceeding a variation threshold indicates the presence of a discontinuity in the signal corresponding to a change of time segment. These various segments are recorded in the structure of the meta-identifier as a corresponding number of nodes linked by arcs representing time continuity.

3. Tool for segmentation in space: a space segmentation filter is used to determine various objects making up an image scene. To do this, various methods are used in parallel, together or separately:
texture segmentation: filter;
color segmentation: calculate color distribution;
contour segmentation: active contours.

Figure 8:
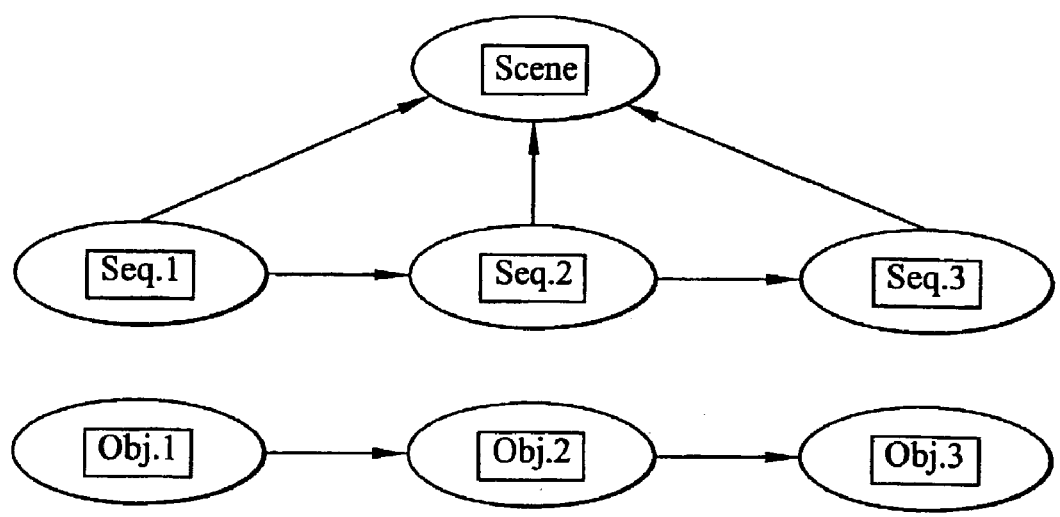
FIG. 8 is a diagram showing a process of segmenting a multimedia document into more elementary components.

These methods make it possible to extract various objects within each sequence and within a series of sequences. Thereafter, similarities are determined (simple correlation, correlation based on previously presented uniformly criteria or on similarity calculations) in order to recognize whether a plurality of successive objects in a plurality of images of the same sequence or of a plurality of sequences genuinely constitute the same conceptual object. Under such circumstances, a single representation is created per sequence in the form of a node of the meta-identifier and this node is connected to the nodes representing the scene by an arc encoding an inclusion relationship. Representations of identical objects in two successive scenes are also connected by means of an arc encoding an identity relationship (see FIG. 8).

4. Abstract segmentation: specific objects are identified by specific means:
by applying OCR to image data, text that is included in the images can be extracted;
by applying a speech processing tool, text can be produced that transcribes the content of utterances by any speakers in a sound track;
by applying specific detectors (face detectors, movement detectors, etc.).

The result from each of these specific tools produces a specific object which is recorded in the meta-identifier together with its nature and its content stored in the weighting of the corresponding node. The relationships of this object being included in the scene or with other objects of the scene are recorded by means of arcs connecting the node with the nodes corresponding to other objects.

The stage which follows segmentation is identification of the objects: for each of the objects identified in the meta-identifier, appropriate methods are used to determine identification information specific to each object. To do this, the image methods described above are used, or sound methods are used as described below. The other information is stored in textual manner and is encoded by key words as a function of the information concerned: for example "turning through 90° in the clockwise direction".

It should be observed that the results of intermediate calculations which are performed during these steps are conserved throughout the calculation in order to enable them to be reused by the subsequent algorithms.

There follow examples of methods used when characterizing audiovisual documents.

The indexing of audiovisual media in a database can require reference to various different kinds of information. To begin with it is possible to distinguish immediately extractable "atomic" information of unique appearance in the audiovisual document that is independent of context:

1. Text in a media image: this is recognized by OCR software acting on the media images constituting the audiovisual sequence. Additional information relating to media images (texts written on objects in the sequence, trademarks, light signs) can possibly be associated, but must be capable of being distinguished reliably from texts that have been deliberately overlaid on the image.

2. Spoken text: this is recognized from the sound track. Voice analysis software makes it possible to extract in the form of text and annotations the utterances on the sound track of the document. Additional information may be added thereto, such as distinguishing between speakers, the conditions under which they are speaking, and possibly identifying speakers. More complex tools can be added to such raw extraction in order to associate text semantics more finely with media image semantics. For example, the term frequency-inverse document frequency (TF-IDF) method measures the relative importance of words in a video document on the basis of a reference corpus. Words that are particularly frequent in one shot but rare in a corpus probably correspond to key information for the sequence.

3. Noise and music: in addition to speech, sound tracks contain music and sound effects which may be made use of to some extent, for example identifying a noise that is characteristic of an action (a door slamming, a telephone ringing, etc.) which may constitute crucial information for describing the sequence that is to be indexed. It is also possible to envisage identifying music.

4. Splitting up into shots: changes of scene can be identified, with certain reserves, and give information about the overall structure of the video sequence. Once identified, shots enable other characteristics to be analyzed such as "summary media images". The segmentation of audiovisual documents into shots occupies a central position amongst the methods that can be used for audiovisual indexing. As yet no method exists for detecting different types of transition effect with 100% reliability. Nevertheless, more and more methods are being proposed for providing effective processing of certain types of transition such as "cut".

5. "Summary media images": a summary is a media image representing the major static characteristics of a shot in a video sequence. This can be a very simple technique, for example selecting the first or the last media image of the shot, or it may be a technique that is more sophisticated, such as constructing a mosaic media image of scenes involved in the shot. A conventional still media image indexing technique can then be applied for indexing the visual information characteristic of the sequence being analyzed.

6. Camera movements/object movements: depending on shooting conditions, it is possible from the stream of images to analyze displacement of the camera or of the objects filmed, zooms, pans, crowd movements, or movements of single objects. This information can be used for qualifying certain scenes and thus providing dynamic content for the semantics of the shot to be indexed.

7. Transitions: under good conditions, it is possible to analyze the categories of transition selected during editing of the video sequence. The information corresponding to such transitions can serve to identify structural relationships between shots, for example by identifying different jingles when changing topic in a TV news broadcast. This analysis also needs to rely on audio aspects as well.

8. Video objects: the existence of objects can be determined and tracked during a video sequence.

It can consist in:
either using specialized methods, that are often static and applied to a single media image:
face recognition;
geometrical shape recognition;
texture matching;
or else more general methods, that are often dynamic and applied to a sequence:
tracking a moving object which is different from its environment (tennis balls, football players);
identifying a background, and segmenting it into perspective planes.

This information can then be made more concrete in the form of a series of media image pieces or composite media images (possibly themselves mosaic media images) which, like the "summary media images" can be indexed directly. The advantage of separation into individual objects is crucial for semantic interpretation of the sequence and for searches based on an object theme.

There follows a description of a characterization mechanism based on a meta-identifier applied to sound media, i.e. to media relying on a one-dimensional digital representation of any sound mechanism, regardless of whether it relates to sounds, human voice, music, shouts, or noise: salient points are determined on one or more envelopes of the sound signal computed at different resolutions so as to calculate signatures capable of characterizing the signal locally. The process takes place in four stages:

The first stage consists in calculating signal envelopes at different resolutions by applying wavelet encoding filters on the signal in succession. Various wavelets such as Mallat, Daubechies, Coifman, Coiflets, wavelet packets, etc. can be used. The filters are applied to the original signal so as to produce a detailed signal and an approximation signal. The filters are reapplied on the signals produced in this way, and this operation is reproduced several times over as a function of the sampling of the original signal. The set of intermediate and final signals as produced in this way is then simplified in order to produce envelopes. This simplification is performed by applying a filter (a median filter, a mean filter, . . . ).

The second stage consists in determining salient points. To do this, relative variation of the signal is calculated to first and second orders in order to reduce the points for which these variations are at a maximum (together or exclusively) in the simplified signals produced by the first stage.

The third stage consists in vectorizing the signal. It thus consists in representing the salient points found in the preceding stage by their positions in time-energy space or in frequency-energy space.

The fourth stage consists in calculating information characterizing variation of the signal. Thus, this information is calculated around a salient point and between two successive salient points within the maximum resolution signal. This first information is then stored in the weighting of the node of the corresponding meta-identifier. This second information is stored in the weighting of the arc connecting the two corresponding nodes. The characterization information comprises the average of the local derivatives of the signal to the first two orders (any other information of a geometrico-mathematical kind may also be useful). The process is reproduced at the next lower level of resolution, storing the inclusion relationship in a hierarchical level of the meta-identifier, and the process is iterated over each resolution calculated by the wavelets.

By way of example, there follows a description of a method of indexing text applied to text media serving to build up a meta-identifier by reformulation and by vector representation of sentences. Nevertheless, other systems for indexing text in natural or other language can be used.

In typical manner, a system for indexing text in natural language (NL) is as follows: the text indexing system is made up of two portions: a first portion transforms the wording of the sentences written in natural language that are introduced into the system (whether for the purpose of being registered and indexed or for the purpose of serving as requests for finding previously registered documents). This transformation seeks to identify groups of words that possess their own meaning, with this being done using dictionaries (referred to as NL dictionaries) and to separate them from "utility" words (such as linking words, articles, etc.). These groups of words are replaced initially by the purest synonyms, then by polysemous synonymous, then by close concepts, then by concepts that are in the same semantic neighborhood, etc. Decreasing weights are associated with each of these synonyms as a function of distance from the original word using empirical criteria; this is referred to as the "synonymy weighting". The other words are ignored. Grammatical analysis is used to reduce inflected words to a simple form of inflection (verb conjugations are replaced by the infinite, plural nouns by the singular). Once this stage of rewriting has terminated, the second stage begins which differs depending on whether the text is a request or text for adding to the database. If the text is for adding to the database, an inverted table of nouns is produced in order to make it easy to find for each word or each group of words in the NL dictionary the various texts where these words occur, together with their position(s) in the texts. This table constitutes the table giving access to the document. This inverse table is concatenated with the table already present in the database and is sorted in lexicographic order or in inverse lexicographic order (depending on the type of language being processed). The documents themselves are stored independently, for example in the form of files. When a request is being processed, the request as rewritten by the first stage is compared word by word or word group by word group with the inverse tables in order to find texts where these words are present. Each appearance of a word is associated with the synonym weighting as associated therewith during the first stage. A score is produced by summing the weights. Documents containing texts that obtain high scores are the most pertinent. A list of documents classified by order of decreasing pertinence is produced.

The various structural relationships that can be involved within the meta-identifier and the mechanism connecting the information coming from the various monomedium indexing engines are briefly described below.

The signatures obtained from each monomedium indexing engine (i.e. an engine working on one medium only) are in the form of hypergraphs weighted by vectors of digital or text values representing the local characteristics associated with the salient points (points of interest in the images, limits of sound envelopes for sounds, etc.) in each of the media. These vectors can themselves be replaced hierarchically by hypergraphs in monomedium engines that make use of a plurality of methods in association. This hierarchical approach can be iterated so as to produce a single hypergraph representing the signature of the characteristics linking the various sub-hypergraphs of vectors of numerical values associated with each level of processing (multimedia, monomedium, methods within a given medium, etc.). The arcs of these hypergraphs serve to carry specific relationships corresponding to different kinds of structural information that can be found within a multimedia document (such as the link between a figure and its text legends, or the geometrical transformation for moving from one point of interest to another).

Searching within such a structure represented by a hypergraph having nodes and branches weighted by information can be performed by means of a method of comparing sub-hypergraphs (eliminating a vertex or an arc, adding a vertex or an arc, replacing a vertex or an arc) associated with scores by means of a method that is frozen (such and such an operation is worth such and such a number of points) or by means of a method involving training (with feedback of information from a user). Under all circumstances these scores must take account (e.g. by simple multiplication) of the relative costs of distances between the weights of branches or nodes determined in the meanings of the methods specific to each monomedium indexing engine.

The invention claimed is:

1. A computer implemented method of comparing first and second composite multimedia documents, each comprising at least two individual media selected from categories comprising images, sounds, video signals, animated vector graphics, and texts, the method comprising the following steps:

a) allocating a meta-identifier to each of the first and second composite multimedia documents, which meta-identifier is in the form of a weighted hypergraph of nodes and relationships between said nodes and includes meta-segments unambiguously identifying individual media making up the multimedia document concerned;

b) performing recursion over secondary trees of intra-medium relationships of the individual media of each of the first and second composite multimedia documents;

c) for the hypergraph of each individual medium of the first multimedia document, performing an operation of maximizing matching with the hypergraph of an individual medium of the second multimedia document;

d) for the hypergraph of each individual medium of the first multimedia document, determining the costs of editing operations leading to maximum or quasi-maximum matching with a hypergraph of an individual medium of the second multimedia document, and expressing distances between the individual media as a function of said costs;

e) performing recursion over the main tree for producing inter-media relationships between the individual media of each of the first and second composite multimedia documents;

f) for the hypergraph of all of the individual media of the first multimedia document, performing an operation of maximizing matching with the hypergraph for all of the individual media of the second multimedia document; and g) for the hypergraph of all of the individual media of the first multimedia document, determining the costs of the edit operation that produces maximum or quasi-maximum matching with a hypergraph of all of the individual media of the second multimedia document, and expressing the distance between the first and second composite multimedia documents as a function of said cost.

2. A method according to claim 1, characterized in that steps c) and d), themselves comprise the following steps:

c1) for each individual medium of the first multimedia document to be compared with an individual medium of the second multimedia document, defining as a function of the looked-for similarities, an intra-medium cost function based on a principle of editing hypergraphs making reference to a similarity distance between hypergraphs;

c2) exploring all of the possible transformations enabling the hypergraph of each of the individual media of the first multimedia document to be transformed into a hypergraph, wherein the hypergraph is as close as possible to the hypergraph of each of the individual media of the second multimedia document;

d1) determining the cost of each transformation in application of the rules defined in step c1); and d2) for each of the individual media of the first multimedia document, selecting the transformation of lowest cost.

3. A method according to claim 1, characterized in that steps f) and g) themselves comprise the following steps:

f1) for all of the individual media of the first multimedia document to be compared with the individual media of the second multimedia document, defining as a function of the looked-for similarities, an inter-media cost function based on a principle of editing hypergraphs with reference to a similarity distance between hypergraphs;

f2) exploring all of the possible transformations enabling the hypergraph of the first composite multimedia document to be transformed into a hypergraph that is as close as possible to the hypergraph of the second composite multimedia document;

g1) determining the cost of each transformation in application of the rules defined in step f1); and g2) selecting the transformation of lowest cost.

4. A method according to claim 1, characterized in that steps c) and d) comprise implementing a sub-optimal optimization method such as a genetic algorithm, processing by a neural network or by simulated annealing, thereby producing a transformation having a cost, wherein the cost is lowest in the context of the optimization method used.

5. A method according to claim 1, characterized in that steps f) and g) comprise implementing a sub-optimal optimization method such as a genetic algorithm, processing by a neural network or by simulated annealing, thereby producing a transformation whose cost is lowest in the context of the optimization method used.

6. A method according to claim 1, characterized in that when comparing a first composite multimedia document to which a meta-identifier is allocated and which is segmented into meta-segments, point-to-point comparison is performed of meta-segments of vector kind by means of a vector distance selected from distances of the Euclidean, Reimann with parameter L, and Mahalanobis types, so as to produce results constituting scores for pairing between meta-segments compared in pairs, and comparing meta-segments of the hypergraphs and producing a synthesized score for the distance between the documents by weighting the results of the point-to-point comparisons of the meta-segments by means of the probability of pairing between each corresponding branch of the trees of the two documents.

7. A method according to claim 1, further comprising storing the first and second multimedia documents in a database, comprising organizing hypergraphs representing the meta-identifiers of the first and second multimedia documents to be archived by automatic hierarchical classification of branches that are common, identical, or quasi-identical.

8. A method according to claim 7, characterized in that the addition of a new meta-identifier corresponding to a multimedia document for archiving in a database already comprising a set of meta-identifiers and a set of intermediate objects representing portions of meta-identifiers designed to be easily recognized comprises the following steps:

i) breaking down the new meta-identifier into individual meta-identifiers encoding the various individual media contained in the multimedia document to be archived;

ii) constructing a tree for producing relationships between individual media; and iii) recursively applying steps i) and ii) to each individual meta-identifier to produce trees for producing relationships within each of the individual media, the trees being stored independently, but inclusion relationships being added to mark the links between an individual medium described in the tree for producing relationships between the individual media and the components of said individual medium in the tree for producing relationships within said individual medium under consideration.

9. A method according to claim 8, characterized in that the step of breaking down a new meta-identifier is performed by scanning the entire hypergraph associated with the new meta-identifier and selecting groups of adjacent nodes having an identical medium.

10. A method according to claim 8, characterized in that the step of constructing a tree for producing relationships between individual media comprises, in particular, the following operations:

constructing a simplified hypergraph by associating a node with each individual meta-identifier and copying the relationships linking the nodes of the individual media to the respective meta-identifiers, while eliminating relationships of the same kind linking the same two nodes;

subdividing the hypergraph into connected sub-hypergraphs by increasing number of nodes;

organizing similar sub-hypergraphs having the same number of nodes into classes;

characterizing each class by a single representative holding average properties for the elements of the class; and organizing the previously defined classes in a hierarchical manner by means of similarity relationships between portions of the representatives.

11. A method according to claim 1, further comprising:
searching for a multimedia document archived in a database;
presenting a composite request comprising multimedia documents linked together by logical operators;
allocating a meta-identifier to each of the multimedia documents of the database, which meta-identifier is in the form of a weighted hypergraph of nodes and relationships between the nodes and includes meta-segments identifying in unambiguous manner the individual media making up the multimedia document concerned;
allocating a meta-identifier to the composite request, which meta-identifier is in the form of a weighted hypergraph of nodes and relationships between the nodes and includes meta-segments identifying unambiguously the individual media making up the composite request;
performing recursion over secondary trees of intra-medium relationships of the individual media of each of the multimedia documents of the database;
performing recursion over the secondary trees of the intra-medium relationships of the individual media of the composite request;
performing recursion over the main tree for producing inter-media relationships between the individual media of each of the multimedia documents of the database;
performing recursion over the main tree for producing inter-media relationships between the individual media of the composite request;
producing an overall hypergraph combining all of the hypergraphs of the composite request linked by said logic operators; and
comparing said overall hypergraph with the hypergraphs of the multimedia documents of the database in application of the following steps:
for the hypergraph of each individual medium of the composite request, an operation of maximizing matching with the hypergraph of an individual medium of each of the multimedia documents of the database;
for the hypergraph of each individual medium of the composite request, determining the costs of edit operations that lead to maximum or almost maximum matching with a hypergraph of an individual medium of each of the multimedia documents of the database, and expressing distances between the individual media as a function of said costs;
for the hypergraph of all of the individual media of the composite request, an operation of maximizing matching with the hypergraph of all of the individual media of each of the multimedia documents of the database;
for the hypergraph of all of the individual media of the composite request, determining the costs of edit operations leading to maximum or almost maximum matching with a hypergraph of all of the individual media of each of the multimedia documents of the database, and expressing distances between the composite request and each of the multimedia documents of the database as a function of said costs; and
organizing a list of multimedia documents of the database in decreasing order of previously calculated costs.

12. A method according to claim 11, characterized in that the steps of individually processing multimedia documents of the database are performed prior to presenting a composite request, and the results of said individual processing steps are stored for processing a set of different composite requests, wherein the database is organized by arranging hypergraphs representing the meta-identifiers of the multimedia documents to be archived by automatic hierarchical classification of identical or almost identical branches they have in common, and wherein a hierarchical search is performed in a tree structure of classes of hypergraphs of all of the multimedia documents of the database, and comparisons are performed between the overall hypergraphs of the composite request and the representatives of said classes, without comparing the full hypergraph of the composite request with the hypergraphs of all of the multimedia documents in the database.

13. A method according to claim 1, characterized in that at least one individual medium is a monomedium document belonging to a single category of media.

14. A method according to claim 1, characterized in that at least one individual medium is a multimedia document comprising sub-elements belonging to different categories of media.

15. A computer implemented method of indexing a composite multimedia document comprising at least two individual media selected from categories comprising images, sounds, video signals, animated vector graphics, and texts, comprising:
a) allocating a meta-identifier to composite multimedia document, which meta-identifier is in the form of a weighted hypergraph of nodes and relationships between said nodes and includes meta-segments unambiguously identifying the individual media making up the composite request multimedia document;
b) performing recursion over secondary tree structures of intra-medium relationships of the individual media of the composite multimedia document;
c) performing recursion over the main tree structure for producing inter-media relationships between the individual media of the composite multimedia document; and
d) storing multimedia documents in a database, comprising organizing hypergraphs representing the meta-identifiers of the multimedia documents to be archived by automatic hierarchical classification of common, identical, or quasi-identical branches.

16. A method according to claim 15, characterized in that the addition of a new meta-identifier corresponding to a multimedia document for archiving in a database already comprising a set of meta-identifiers and a set of intermediate objects representing portions of meta-identifiers designed to be easily recognized comprises the following steps:
i) breaking down the new meta-identifier into individual meta-identifiers encoding the various individual media contained in the multimedia document to be archived;
ii) constructing a tree for producing relationships between individual media; and
iii) recursively applying steps i) and ii) to each individual meta-identifier to produce trees for producing relationships within each of the individual media, the trees being stored independently, but inclusion relationships being added to mark the links between an individual medium described in the tree for producing relationships between the individual media and the components of said individual medium in the tree for producing relationships within said individual medium under consideration.

17. A method according to claim 16, characterized in that the step of breaking down a new meta-identifier is performed by scanning the entire hypergraph associated with the new meta-identifier and selecting groups of adjacent nodes having an identical medium.

18. A method according to claim 15, characterized in that the step of constructing a tree for producing relationships between individual media comprises, in particular, the following operations:

constructing a simplified hypergraph by associating a node with each individual meta-identifier and copying the relationships linking the nodes of the individual media to the respective meta-identifiers, while eliminating relationships of the same kind linking the same two nodes;

subdividing the hypergraph into connected sub-hypergraphs by increasing number of nodes;

organizing similar sub-hypergraphs having the same number of nodes into classes;

characterizing each class by a single representative holding average properties for the elements of the class; and organizing the previously defined classes in hierarchical manner by means of similarity relationships between portions of their representatives.

* * * * *

UNITED STATES PATENT AND TRADEMARK OFFICE
CERTIFICATE OF CORRECTION

PATENT NO. : 6,988,093 B2  Page 1 of 1
APPLICATION NO. : 10/270250
DATED : January 17, 2006
INVENTOR(S) : Marc Pic et al.

It is certified that error appears in the above-identified patent and that said Letters Patent is hereby corrected as shown below:

Column 11, line 16, "and 1)" should read --and I)--; and

Column 17, line 34, "calorimetric" should read --colorimetic--.

Signed and Sealed this

Twenty-eighth Day of November, 2006

JON W. DUDAS
*Director of the United States Patent and Trademark Office*